United States Patent
Johnson, Jr. et al.

(10) Patent No.: US 6,694,766 B1
(45) Date of Patent: Feb. 24, 2004

(54) POWER GENERATION SYSTEMS WITH EARTH HEAT TRANSFER

(75) Inventors: Howard E. Johnson, Jr., Kennesaw, GA (US); Gregory Tinkler, Houston, TX (US)

(73) Assignee: Enlink Geoenergy Services, Inc., Houston, TX (US)

( * ) Notice: Subject to any disclaimer, the term of this patent is extended or adjusted under 35 U.S.C. 154(b) by 0 days.

(21) Appl. No.: 10/225,451

(22) Filed: Aug. 21, 2002

(51) Int. Cl.[7] .......................... F25B 27/00; F25D 23/12; F03G 7/00
(52) U.S. Cl. ........................ 62/238.4; 62/260; 60/641.2
(58) Field of Search ................................. 62/238.4, 260, 62/513; 1695/45; 60/641.2, 641.1, 659, 39.5

(56) References Cited

U.S. PATENT DOCUMENTS

| | | | |
|---|---|---|---|
| 4,325,228 A | 4/1982 | Wolf ........................... | 62/260 |
| 4,912,941 A | 4/1990 | Buchi .......................... | 62/260 |
| 5,129,236 A | 7/1992 | Solomon .................... | 62/324.1 |
| 5,598,706 A | 2/1997 | Bronicki et al. ............ | 60/641.2 |
| 6,233,951 B1 * | 5/2001 | Cardill ......................... | 62/81 |

OTHER PUBLICATIONS

U.S. Official Gazette–Patents, entry for U.S. Patent 5,911,684; Jun. 15, 1999.
Hot Times For Turbine Cooling, Mercer, Diesel & Gas Turbine Worldwide, Apr. 2002.
Increase Turbine Output, Gas Turbine Inlet Cooling, AMCO, 2001.
Amco Inlet Fog System Summary, American Moistening Company, Jan. 2002.

* cited by examiner

Primary Examiner—Chen Wen Jiang
(74) Attorney, Agent, or Firm—Guy McClung

(57) ABSTRACT

A system for increasing efficiency of a closed-earth-loop heat pump system; for increasing heat pump efficiency by feeding relatively colder water to heat pumps when they operate in a cooling mode; and, in certain aspects, systems for using excess produced heat and/or waste heat generated by an air conditioning system that employs an earth loop heat exchange apparatus, the system having power production apparatus that uses the excess produced heat and/or waste heat from air conditioning apparatus to generate electricity and reduce the heat dissipation load on the earth loop heat exchange apparatus; and, in one aspect, such a system that provides cooling fluid to a fuel cell that produces water and electricity.

22 Claims, 1 Drawing Sheet

POWER GENERATION SYSTEMS WITH EARTH HEAT TRANSFER

BACKGROUND OF THE INVENTION

1. Field of the Invention

The present invention, in at least certain embodiments, is directed to heat pump systems with enhanced efficiency that control inlet water supply temperature by the inclusion steam turbine(s) and/or fuel cells in a water circuit; and to power generation systems that use waste heat exchange system to dissipate heat from air conditioning systems that employ earth loop heat exchange apparatus.

2. Description of Related Art

The prior art discloses a variety of air conditioning systems that provide cool air and exhaust hot air. In many such systems the hot air generated by an air conditioner is vented to the atmosphere. The prior art also discloses a wide variety of earth heat exchange systems which typically include conduit, conduits, and/or a pipe loop within the earth, apparatus for circulating heat transfer fluid therethrough and through other systems or apparatuses above the surface. When such an earth heat exchange system is used with an air conditioner, e.g., but not limited to a heat pump, the heat that must be dissipated in the earth can overload or overwhelm the system and/or slow down the cooling process.

There has long been a need, recognized by the present inventor, for an air conditioning system that can efficiently and effectively use an earth loop heat exchanger. There has long been a need, recognized by the present inventor, to usefully employ the waste heat generated by such a system.

SUMMARY OF THE PRESENT INVENTION

The present invention, in at least certain embodiments, discloses HVAC (heating, ventilation, and air conditioning) systems that increase the efficiency of heat pumps and fuel cells by lowering or raising temperature of water supplied to a heap pump. The temperature of the supply water, in certain aspects, is controlled by the operation of a device, e.g. a water/refrigerant/water heat exchanger. In one aspect, excess heat rejected by the heat pump(s) and/or fuel cell(s) to the water loop system is used by a steam turbine to produce electric power.

The present invention, in at least certain aspects, discloses a system for providing relatively cooler input water to air conditioning apparatus and/or heat pumps operating in a cooling mode and, in certain aspects, the use of rejected heat from the air conditioning apparatus and/or heat pumps to generate electricity and to facilitate the production of electrical power. In one aspect, earth heat transfer loops facilitate the provision of relatively cooler input water for the air conditioning apparatus and/or heat pumps.

The present invention, in certain aspects, discloses a system for using waste heat generated by an air conditioning system that utilizes one or more earth loop heat exchangers or other thermal buffer. In one embodiment, the present invention provides a system that includes one or more heat pumps used to produce cool air for cooling a building or other structure. Heat from the one or more heat pumps is supplied to a mechanical heat exchanger, e.g., but not limited to, a water-to-refrigerant-to-water device, which extracts heat from the fluid. Water superheated by this heat exchanger is converted to steam to power a turbine that rotates a generator to produce electricity. Optionally, material to be vented from the steam turbine is fed to a vent heat exchanger to recover useful heat from the material prior to venting it. As needed, supply or "make-up" water is provided from a water supply to the system and to replenish a steam production circuit. Such water is, optionally, pure, distilled and/or filtered with appropriate filtration apparatus, e.g. to remove foreign materials or undesirable substances or compounds which could foul a heat exchanger or inhibit the heat transfer process.

In certain embodiments, a closed loop water circulation system thermally connects the heat pump water system to heat removal equipment (i.e. water to refrigerant to water heat exchanger) and to the heat storage device or "thermal buffer" (i.e. pipe loops installed in the earth, ice storage, lake, water tank, etc.), to the optional waste heat production equipment (i.e. fuel cell), and to a steam-turbine-powered electric generator.

In one aspect, by using a power generating apparatus and heat pump(s) according to the present invention, the size of an earth loop heat exchange system (or other thermal buffer) can be reduced since the amount of heat from the heat pump(s) that must be dissipated in the earth via earth loops of the system is reduced. The heat used to generate power can be, but does not need to be, dissipated in the earth. Consequently a smaller field of multiple earth loops can be used in such a system.

In one aspect, by including a water-to-refrigerant-to-water heat extracting device into a heat pump water circuit according to the present invention, more heat can be removed from the heat pump water circuit than can be removed by direct conductive heat transfer. For example, if the temperature of the earth is 70 degrees F., the returning water temperatures to the heat pumps will not be below 70 degrees F.; and as heat is transferred to the earth as the heat pumps operate in the cooling mode, earth temperatures increase resulting in higher and higher temperature water being returned to the heat pumps. The supply water to the heat pumps can be reduced below the temperatures possible in a conventional closed or open loop "geothermal" heat pump system. This relatively cooler inlet water results in much higher operating efficiencies of the heat pumps when they are operated in the cooling mode, and in one particular aspect reducing the electric power required by the heat pump by about 50%. By using the heat rejected by the system to economically produce valuable electric power, the cost of extracting this waste heat is more than offset.

In another aspect, in a system according to the present invention, when a device such as a fuel cell is connected to the supply/return water system, some (or all) of the waste heat generated by the fuel cell, instead of being used to generate power, is diverted to increase the inlet water temperature to the heat pumps when they are operating in a heating mode. Similarly, the heat pumps can be fed water at much higher temperatures than is possible in a conventional geothermal heat pump system, again resulting in much higher operating efficiencies. Also, it is within the scope of the present invention to exhaust some or all of the heat produced by a fuel cell to the atmosphere. Water produced by fuel cell(s) can be used in the system.

In yet another aspect in a system according to the present invention, a heat pump or pumps are operated in the heating mode and a fuel cell (or fuel cells) is connected to the system; thus an earth loop heat exchanger in the system is reduced in size since less heat is required from the earth due to the heat extracted from the fuel cell(s). The use of smaller earth heat exchangers and/or thermal buffer(s) can result in capital savings in construction.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious systems for increasing the efficiency of an air conditioning system that uses an earth loop, lake loop, ice storage, or buffer storage tank heat exchange system; and methods for dissipating the waste heat generated by an air conditioning system that uses an earth loop heat exchange system and/or thermal buffer(s);

Such systems and methods that utilize excess produced heat and/or waste heat to generate power;

Such systems and methods with relatively smaller earth loop systems and/or systems with fewer earth loops, or systems with more earth loops based on the amount of heat used to generate power, heat that does not have to be dissipated in the earth;

Such systems and methods with relatively smaller heat buffer and/or storage systems; and systems with more earth loops based on the amount of heat required to economically generate power; and New, useful, unique, efficient, nonobvious devices, systems, and methods for producing power using an air conditioning system that employs an earth loop heat exchange system.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
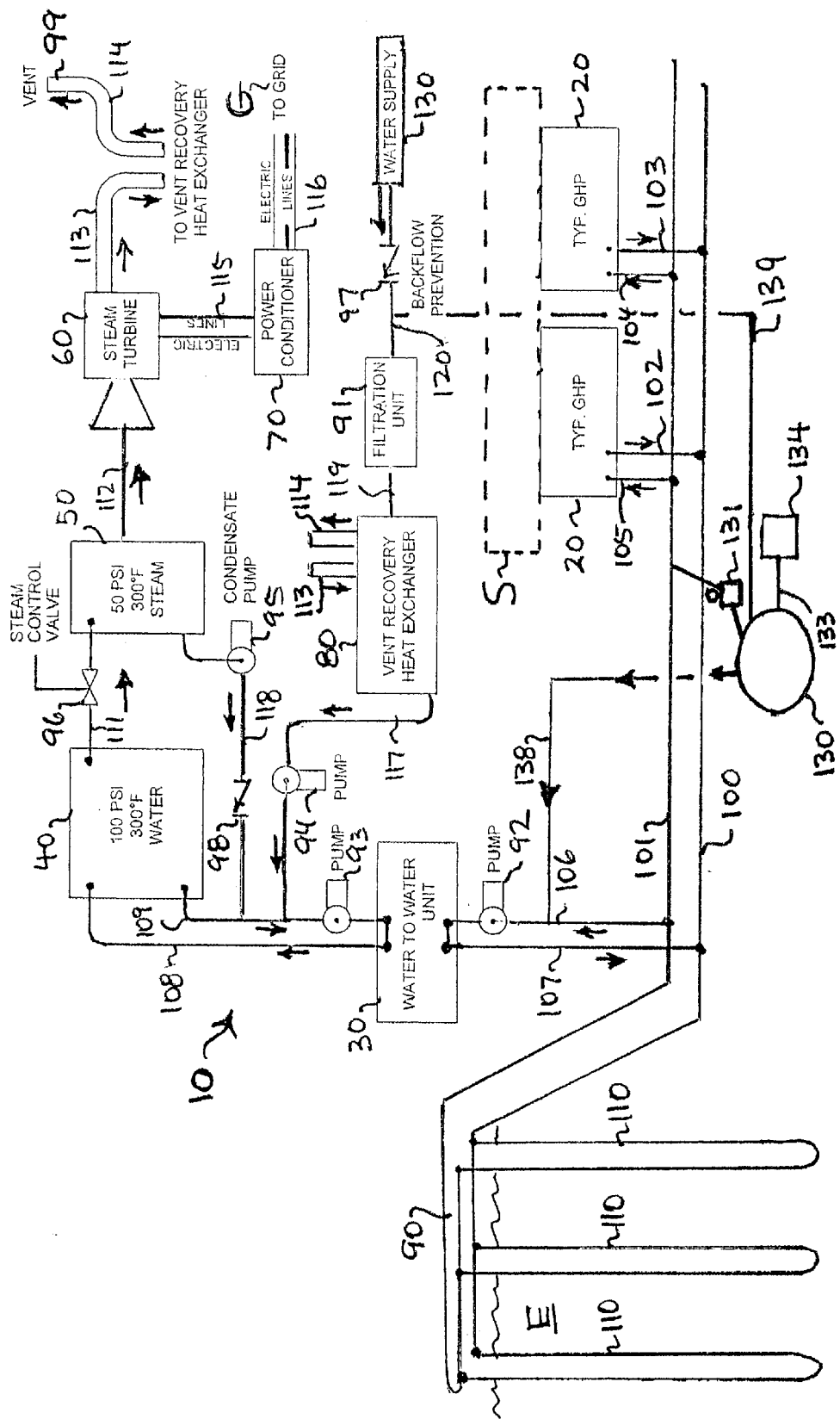
FIG. 1 is a schematic view of a system according to the present invention.

Referring now to FIG. 1, a system 10 according to the present invention includes an earth heat loop system 90 with a plurality of earth heat exchange loops 110 through which a heat transfer fluid circulates. The loops 110 extend down into the earth E to a desired depth.

Any earth loop in any system or method according to the present invention may be, but is not limited to, any earth heat exchange loop as disclosed in U.S. Pat. Nos. 5,590,715; 5,758,724; 5,244,037; 5,261,251; 5,671,608; 5,477,914; 5,706,888; 4,448,237, 4,286,651; 4,574,875; 4,912,941; 3,609,980; 4,325,228; 5,183,100; 5,322,115; and in Swiss Patent CH 653120A5—all such patents incorporated fully herein for all purposes.

One or more ground source heat pumps 20 receive cooled fluid from the earth heat loop system 90 via a flow line 101. In one aspect, e.g., water at 40° F. flows from the earth loops 110 to the heat pumps 20.

The heat pumps 20 provide cooled air, e.g. in one aspect at about 55° F. to a structure S (in dotted line, FIG. 1) and fluid, e.g. in one aspect at about 50° F., exhausted from the heat pumps 20 in flow lines 102, 103 flows in flow line 106 to a heat exchanger 30, pumped by a pump apparatus 92.

The heat exchanger 30 extracts heat from the fluid (e.g. water) from the heat pumps 20 and water at a lowered temperature, e.g. in one aspect at about 36° F., flows back to the earth heat loop system 90 in flow lines 107 and 100. In certain embodiments the heat exchanger 30 is any suitable known water-to-refrigerant-to-water heat exchanger unit or heat compression device. In one aspect the refrigerant used is commercially available R123 refrigerant. Alternatively, line 107 flows into line 101 so that the relatively cold water produced by the heat exchanger 30 is fed to the heat pumps 20 (when they are in a cooling mode) thereby increasing their efficiency. When the heat pumps 20 are being operated in a heating mode, water in lines 107 and line 138 is fed to the heat pumps 20.

A pump 93 pumps water and/or condensate through the other side of the heat exchanger 30. Heated water, e.g. in one aspect at about 300° F., is pumped by the pump 93 in a flow line 108 to a tank 40. The pump 93 provides primary circulation for the line 108/109 loop and maintains pressure to maintain a superheated water condition in the tank 40 and so that the boiling point of the water is maintained at 350° F. Optionally a check valve is provided in the line 109. The pump 93, via the loop of line 108 and line 109 provides for recirculation of water in the tank 40, particularly in the event that the temperature of water near the tank bottom falls below 300° F.

In the tank 40, pressure is increased by the pump 93 to assist in the production of superheated water. In one aspect the tank 40 is pressured up to about 100 p.s.i., thus increasing the boiling point of the water. Super heated water (superheated beyond the boiling point of 212° F.) from the tank 40 flows in a flow line 111 through a steam control valve 96 to a pressure vessel or tank 50. Optionally, the valve 96 and tank 50 are deleted. Pressure in the tank 50 is less than pressure in the tank 40 due to a pressure drop across the valve 96. Steam and condensate are produced in the tank 50. The steam is provided in a flow line 112 to a steam turbine 60. The condensate is pumped by a pump 95 in a line 118 through a backflow preventer 98 to a flow line 109 and is then pumped by the pump 93 to the heat exchanger 30. In one aspect fluid in the line 109 is at a temperature of about 290° F. Condensate exits the tank 50 at about 200° F.

The steam turbine 60 produces electrical power that flows in electric lines 115 to an optional power conditioner 70 which "cleans up" the electricity and produces 60 Hz electricity at a desired voltage and phase for use. Power from the conditioner 70 flows in electric lines 116 to a power user, e.g., but not limited to, a power grid G. Heated air vapor (e.g. with steam and air) exhausted from the steam turbine 60 flows via a flow line 113 to a vent recovery heat exchanger 80 which extracts heat from the material to be vented. A pump 94 pumps heated heat transfer fluid (e.g. water) in a flow line 117 to the flow line 109 for pumping to the heat exchanger 30. Optionally, water supplied from a water supply 130 in a flow line 120 to the vent recovery heat exchanger 80 is filtered by a filtration unit 91. This water flows through a backflow preventer 97. Water in line 117 may be at a temperature of about 140° F. The pressures in various lines is as follows: line 100—30 psi; 101—30 psi; 108—110 psi; 109—100 psi; 117 —120 psi; and 118—120 psi. The steam turbine 60 may be any suitable known turbine, including, but not limited to a BP Series or CX/Dual BP Series turbine generator set available from Turbosteam Corp.

Optionally, fluid in line 101 (e.g. at about 60° F.) is used to cool a fuel cell 130 that produces electricity, (output Electricity in line 132 e.g. D.C. and/or three-phase A.C. electricity). Optionally, electricity produced by the fuel cell 130 is used (via a line 133) to provide power for an HVAC system 134 (or other systems and apparatuses) of, e.g. the building S that, optionally, employs the heat pumps 20; and/or to provide power to a power grid. A pump 131 pumps the fluid from the line 101 to the fuel cell 130 and then in a line 138 to the line 106. It is within the scope of this invention to use any known earth thermal transfer loop with any known fuel cell to provide cooling fluid to the fuel cell. Water produced by the fuel cell 130 is fed in a line 139 to the line 120 for use in the system; and/or such water may be discharged or fed to other apparatus either in or apart from the system. Optionally, the water in the line 138 can be fed into the line 100.

In one particular embodiment of the system of FIG. 1, temperatures in the lines are as follows:

| Line No. | Temperature ° F. |
| --- | --- |
| 100 | 50 |
| 101 | 40 |
| 102 | 50 |
| 103 | 50 |
| 104 | 40 |
| 105 | 40 |
| 106 | 40 |
| 107 | 36 |
| 108 | 300 |
| 109 | 295 |
| 111 | 300 |
| 112 | 300 |
| 113 | 250 |

-continued

| Line No. | Temperature ° F. |
| --- | --- |
| 114 | 190 |
| 117 | 140 |
| 118 | 200 |
| 119 | 60 |
| 120 | 60 |
| 138 | 170 |

Water pumped by the pump 93 to the heat exchanger 30 when water from the tank 40 is at about 295° F. and water in the line 112 is about 140° F. will be about 210° F.

The present invention, therefore, provides in certain, but not necessarily all embodiments, a system for providing inlet water to air conditioning apparatus, the system with earth loop heat transfer apparatus, said earth loop heat transfer apparatus producing a primary stream of cooled water, apparatus for conveying exhausted water from air conditioning apparatus, heat exchange apparatus for receiving the exhausted water from the air conditioning apparatus, the heat exchange apparatus for producing a first stream of heated water and a second stream of cooled water, conveyance apparatus for combining the second stream of cooled water from the heat exchange apparatus with the primary stream from the earth loop heat transfer apparatus to produce a combined cooled water stream for feeding to the air conditioning apparatus. Such a system may have one or some of the following, in any combination: power generation apparatus for producing electric power using steam, steam production apparatus for feeding steam to the power generating apparatus, the steam production apparatus receiving the first stream of heated water from the heat exchange apparatus to facilitate the production of steam.

The present invention, therefore, provides in certain, but not necessarily all embodiments, a system for using waste heat generated by an air conditioning apparatus, the system including first heat exchange apparatus, supply apparatus for supplying heat from an air conditioning apparatus to the first heat exchange apparatus, steam production apparatus, provision apparatus for providing heat extracted by the first heat exchanger from the heat from the air conditioning apparatus to the steam production apparatus, steam turbine/generator apparatus ["steam turbine apparatus"] for receiving heat provided by the provision apparatus, the steam turbine/ generator apparatus for producing electricity, and thermal transfer earth loop apparatus for providing cooling fluid to the air conditioning apparatus. Such a system may have one or some of the following in any possible combination: wherein the first heat exchange apparatus is a water-to-refrigerant-to-water heat exchanger; wherein refrigerant for the heat exchanger is commercially available R123 refrigerant; wherein the steam production apparatus includes a first tank system for producing steam at a first temperature and at a first pressure, and a second tank system for receiving steam from the first tank system and processing said steam to produce output steam for the steam turbine/generator apparatus, the output steam at a second pressure lower than the first pressure and at a second temperature substantially equal to the first temperature; wherein the first pressure is about 100 p.s.i. and the second pressure is about 50 p.s.i; wherein the first tank system includes steam control valve apparatus through which steam from the first tank system flows to the second tank system; wherein the steam turbine/ generator apparatus produces exhaust material and the system further has vent apparatus for venting the exhaust material from the steam turbine/generator apparatus, and vent recovery apparatus for recovering heat from the exhaust material; wherein the vent recovery apparatus includes a vent recovery heat exchanger and the system further has vent heat transfer apparatus for providing heat recovered by the vent recovery heat exchanger to the steam production apparatus; water supply apparatus for supplying water to the system; filtration apparatus for filtering the water; water supply apparatus for supplying water to the system through the vent recovery heat exchanger; wherein the air conditioning apparatus includes at least one ground heat pump; wherein the thermal transfer earth loop apparatus includes at least one earth loop extending down into the earth in a loop borehole with grout surrounding the earth loop to enhance thermal transfer and with fluid movement apparatus for moving heat transfer fluid through the earth loop and to and from the air conditioning apparatus; and/or at least one fuel cell for producing electricity, the at least one fuel cell in fluid communication with the thermal transfer earth loop apparatus and/or thermal buffer apparatus so that fluid from the thermal transfer earth loop apparatus and/or thermal buffer apparatus cools the fuel cell.

The present invention, therefore, provides in certain, but not necessarily all embodiments, a system for using waste heat generated by an air conditioning apparatus, the system having first heat exchange apparatus, supply apparatus for supplying heat from an air conditioning apparatus to the first heat exchange apparatus, steam production apparatus, provision apparatus for providing heat extracted by the first heat exchanger from the heat from the air conditioning apparatus to the steam production apparatus, steam turbine/generator apparatus for receiving heat provided by the provision apparatus, the steam turbine/generator apparatus for producing electricity, and thermal transfer earth loop apparatus for providing cooling fluid to the air conditioning apparatus, wherein the steam production apparatus includes a first tank system for producing steam at a first temperature and at a first pressure, and a second tank system for receiving steam from the first tank system and processing said steam to produce output steam for the steam turbine/generator apparatus, the output steam at a second pressure lower than the first pressure and at a second temperature substantially equal to the first temperature, wherein the steam turbine/generator apparatus produces exhaust material and the system further has vent apparatus for venting the exhaust material from the steam turbine/generator apparatus, and vent recovery apparatus for recovering heat from the exhaust material, wherein the vent recovery apparatus includes a vent recovery heat exchanger and the system further has vent heat transfer apparatus for providing heat recovered by the vent recovery heat exchanger to the steam production apparatus, and water supply apparatus for supplying water to the system.

The present invention, therefore, provides in certain, but not necessarily all embodiments, a method for using waste heat generated by an air conditioning apparatus, the method including supplying heat generated by the air conditioning apparatus to a system for using said heat, the system as any described herein according to the present invention, and using heat from the system in the steam turbine/generator apparatus ["steam turbine apparatus"] to produce electricity. In such a method the first heat exchange apparatus may be a water-to-refrigerant-to-water heat exchanger and wherein refrigerant for the heat exchanger is commercially available R123 refrigerant. In such a method the system's steam production apparatus may include a first tank system for producing steam at a first temperature and at a first pressure, and a second tank system for receiving steam from the first tank system and processing said steam to produce output steam for the steam turbine apparatus, the output steam at a second pressure lower than the first pressure and at a second temperature substantially equal to the first temperature and wherein the first tank system includes steam control valve apparatus through which steam from the first tank system flows to the second tank system. In such a method there may be vent apparatus for venting the exhaust material from the steam turbine apparatus, and vent recovery apparatus for recovering heat from the exhaust material and the method including recovering heat from the exhaust material, and providing said heat to the steam production apparatus. In such a method the system may have at least one fuel cell for producing electricity, the at least one fuel cell in fluid communication with the thermal transfer earth loop apparatus so that fluid from the thermal transfer earth loop apparatus cools the fuel cell, and the method including cooling the at least one fuel cell, and -producing electricity with the fuel cell.

The present invention, therefore, provides in certain, but not necessarily all embodiments, a system for providing inlet water [or other suitable fluid] to air conditioning apparatus, the system including thermal buffer apparatus used to produce a primary stream of cooled water, apparatus for conveying exhausted water from air conditioning apparatus, heat exchange apparatus for receiving the exhausted water from the air conditioning apparatus, the heat exchange apparatus for producing a first stream of heated water and a second stream of cooled water, conveyance apparatus for combining the second stream of cooled water from the heat exchange apparatus with the primary stream from the thermal buffer apparatus to produce a combined cooled water stream for feeding to the air conditioning apparatus.

The present invention, therefore, provides in certain, but not necessarily all embodiments, a system for using waste heat generated by an air conditioning apparatus, the system including first heat exchange apparatus, supply apparatus for supplying heat from an air conditioning apparatus to the first heat exchange apparatus, steam production apparatus, provision apparatus for providing heat extracted by the first heat exchanger from the heat from the air conditioning apparatus to the steam production apparatus, steam turbine/generator apparatus ["steam turbine apparatus"] for receiving heat provided by the provision apparatus, the steam turbine apparatus for producing electricity, and thermal buffer apparatus for providing cooling fluid to the air conditioning apparatus.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A system for using waste heat generated by an air conditioning apparatus, the system comprising
   first heat exchange apparatus,
   supply apparatus for supplying heat from an air conditioning apparatus to the first heat exchange apparatus,
   steam production apparatus,
   provision apparatus for providing heat extracted by the first heat exchanger from the heat from the air conditioning apparatus to the steam production apparatus,
   steam turbine apparatus for receiving heat provided by the provision apparatus, the steam turbine apparatus for producing electricity, and
   thermal transfer earth loop apparatus for providing cooling fluid to the air conditioning apparatus.

2. The system of claim 1 wherein the first heat exchange apparatus is a water-to-refrigerant-to-water heat exchanger.

3. The system of claim 2 wherein refrigerant for the heat exchanger is commercially available R123 refrigerant.

4. The system of claim 1 wherein the steam production apparatus includes
   a first tank system for producing steam at a first temperature and at a first pressure, and
   a second tank system for receiving steam from the first tank system and processing said steam to produce output steam for the steam turbine apparatus, the output steam at a second pressure lower than the first pressure and at a second temperature substantially equal to the first temperature.

5. The system of claim 4 wherein the first pressure is about 100 p.s.i. and the second pressure is about 50 p.s.i.

6. The system of claim 4 wherein the first tank system includes steam control valve apparatus through which steam from the first tank system flows to the second tank system.

7. The system of claim 1 wherein the steam turbine apparatus produces exhaust material and the system further comprising
   vent apparatus for venting the exhaust material from the steam turbine apparatus, and
   vent recovery apparatus for recovering heat from the exhaust material.

8. The system of claim 7 wherein the vent recovery apparatus includes a vent recovery heat exchanger and the system further comprises
   vent heat transfer apparatus for providing heat recovered by the vent recovery heat exchanger to the steam production apparatus.

9. The system of claim 8 further comprising
   water supply apparatus for supplying water to the system through the vent recovery heat exchanger.

10. The system claim 1 further comprising
    water supply apparatus for supplying water to the system.

11. The system of claim 10 further comprising
    filtration apparatus for filtering the water.

12. The system of claim 1 wherein the air conditioning apparatus includes at least one ground heat pump.

13. The system of claim 1 wherein the thermal transfer earth loop apparatus includes at least one earth loop extending down into the earth in a loop borehole with grout surrounding the earth loop to enhance thermal transfer and with fluid movement apparatus for moving heat transfer fluid through the earth loop and to and from the air conditioning apparatus.

14. The system of claim 1 further comprising
    at least one fuel cell for producing electricity,
    the at least one fuel cell in fluid communication with the thermal transfer earth loop apparatus so that fluid from the thermal transfer earth loop apparatus cools the fuel cell.

15. A system for using waste heat generated by an air conditioning apparatus, the system comprising
    first heat exchange apparatus,
    supply apparatus for supplying heat from an air conditioning apparatus to the first heat exchange apparatus,
    steam production apparatus,
    provision apparatus for providing heat extracted by the first heat exchanger from the heat from the air conditioning apparatus to the steam production apparatus,
    steam turbine apparatus for receiving heat provided by the provision apparatus, the steam turbine apparatus for producing electricity, and
    thermal transfer earth loop apparatus for providing cooling fluid to the air conditioning apparatus,
    wherein the steam production apparatus includes
    first tank system for producing steam at a first temperature and at a first pressure, and
    a second tank system for receiving steam from the first tank system and processing said steam to produce output steam for the steam turbine apparatus, the output steam at a second pressure lower than the first pressure and at a second temperature substantially equal to the first temperature,
    wherein the steam turbine apparatus produces exhaust material and the system further comprising
        vent apparatus for venting the exhaust material from the steam turbine apparatus, and
        vent recovery apparatus for recovering heat from the exhaust material,
        wherein the vent recovery apparatus includes a vent recovery heat exchanger and the system further comprises vent heat transfer apparatus for providing heat recovered by the vent recovery heat exchanger to the steam production apparatus, and
        water supply apparatus for supplying water to the system.

16. A method for using waste heat generated by an air conditioning apparatus, the method comprising
    supplying heat generated by the air conditioning apparatus to a system for using said heat, the system comprising
        first heat exchange apparatus, supply apparatus for supplying heat from an air conditioning apparatus to the first heat exchange apparatus, steam production apparatus, provision apparatus for providing heat extracted by the first heat exchanger from the heat from the air conditioning apparatus to the steam production apparatus, steam turbine apparatus for receiving heat provided by the provision apparatus, the steam turbine apparatus for producing electricity, and thermal transfer earth loop apparatus for providing cooling fluid to the air conditioning apparatus, and
    using said heat in the steam turbine apparatus to produce eletricity.

17. The method of claim 16 wherein the first heat exchange apparatus is a water-to-refrigerant-to-water heat exchanger and wherein refrigerant for the heat exchanger Is commercially available R123 refrigerant.

18. The method of claim 16 wherein the system's steam production apparatus includes a first tank system for producing steam at a first temperature and at a first pressure, and a second tank system for receiving steam from the first tank system and processing said steam to produce output steam for the steam turbine apparatus, the output steam at a second pressure lower than the first pressure and at a second temperature substantially equal to the first temperature and wherein the first tank system includes steam control valve apparatus through which steam from the first tank system flows to the second tank system.

19. The method of claim 16 wherein vent apparatus for venting the exhaust material from the steam turbine apparatus, and vent recovery apparatus for recovering heat from the exhaust material and the method further comprising recovering heat from the exhaust material, and providing said heat to the steam production apparatus.

20. The method of claim 16 wherein the system further comprises at least one fuel cell for producing electricity, the at least one fuel cell in fluid communication with the thermal transfer earth loop apparatus so that fluid from the thermal transfer earth loop apparatus cools the fuel cell, and the method further comprises cooling the at least one fuel cell, and producing electricity with the fuel cell.

21. A system for using waste heat generated by an air conditioning apparatus, the system comprising first heat exchange apparatus, supply apparatus for supplying heat from an air conditioning apparatus to the first heat exchange apparatus, steam production apparatus, provision apparatus for providing heat extracted by the first heat exchanger from the heat from the air conditioning apparatus to the steam production apparatus, steam turbine apparatus for receiving heat provided by the provision apparatus, the steam turbine apparatus for producing electricity, and thermal buffer apparatus for providing cooling fluid to the air conditioning apparatus.

22. A system for providing inlet water to air conditioning apparatus, the system comprising earth loop heat transfer apparatus, said earth loop heat transfer apparatus producing a primary stream of cooled water.

apparatus for conveying exhausted water from air conditioning apparatus, heat exchange apparatus for receiving the exhausted water from the air conditioning apparatus, the heat exchange apparatus for producing a first stream of heated water and a second stream of cooled water, conveyance apparatus for combining the second stream of cooled water from the heat exchange apparatus with the primary stream from the earth loop heat transfer apparatus to produce a combined cooled water stream for feeding to the air conditioning apparatus, power generation apparatus for producing electric power using steam, and steam production apparatus for feeding steam to the power generating apparatus, the steam production apparatus receiving the first stream of heated water from the heat exchange apparatus to facilitate the production of steam.

* * * * *